(12) United States Patent
Corbiere et al.

(10) Patent No.: US 11,740,101 B2
(45) Date of Patent: Aug. 29, 2023

(54) METHOD FOR CHARACTERISING BENDS FOR WARNING DRIVERS (71) Applicants: Continental Automotive France, Toulouse (FR); Continental Automotive GmbH, Hannover (DE)

(72) Inventors: Grégoire Corbiere, Toulouse (FR); Jean Ibarz, Toulouse (FR); Romain Lafumat, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 270 days.

(21) Appl. No.: 17/296,753

(22) PCT Filed: Dec. 12, 2019

(86) PCT No.: PCT/EP2019/084913
§ 371 (c)(1),
(2) Date: May 25, 2021

(87) PCT Pub. No.: WO2020/120686
PCT Pub. Date: Jun. 18, 2020

(65) Prior Publication Data
US 2022/0090933 A1 Mar. 24, 2022

(30) Foreign Application Priority Data
Dec. 12, 2018 (FR) ...................................... 1872741

(51) Int. Cl.
*G01C 21/36* (2006.01)
*G08G 1/0967* (2006.01)
*G01C 21/34* (2006.01)

(52) U.S. Cl.
CPC ..... *G01C 21/3629* (2013.01); *G01C 21/3461* (2013.01); *G08G 1/0967* (2013.01)

(58) Field of Classification Search
CPC .... G01C 21/26; G01C 21/34; G01C 21/3629; G01C 21/3461; G08G 1/0967
See application file for complete search history.

(56) References Cited

U.S. PATENT DOCUMENTS 5,465,089 A   11/1995   Nakatani et al.
5,973,731 A   11/1999   Matsuda
(Continued)

FOREIGN PATENT DOCUMENTS

DE   19749916 A1   5/1998
EP    0789225 A1   8/1997
(Continued)

OTHER PUBLICATIONS

English Translation of Written Opinion of the International Searching Authority for International Application No. PCT/EP2019/084913, dated Jan. 24, 2020, 6 pages.
(Continued)

*Primary Examiner* — Tan Q Nguyen
(74) *Attorney, Agent, or Firm* — RatnerPrestia (57) ABSTRACT

A method for characterizing the curvature of a road section, including: selecting, from among the points of the section, the points marking a curvature of the section; computing, for each selected point of the section contained between the second and the penultimate one, an indicator of curvature of the section at this point; identifying each bend contained in the road section, each bend including a set of successive selected points of the section; and for each bend contained in the road section, comparing the indicator of curvature of at least one of the points of the bend with a predetermined threshold. If the indicator of curvature computed for at least
(Continued)

one of the selected points of the bend exceeds the predetermined threshold, recording, in a database, a data record including at least the set of points of the bend, and an item of data characterizing the curvature of the bend.

16 Claims, 4 Drawing Sheets (56) References Cited

U.S. PATENT DOCUMENTS

| | | | |
|---|---|---|---|
| 6,138,084 A | 10/2000 | Mine | |
| 2005/0251335 A1 | 11/2005 | Ibrahim | |
| 2010/0082248 A1* | 4/2010 | Dorum | G06F 16/29 |
| | | | 701/533 |
| 2016/0245657 A1* | 8/2016 | Dorum | G01C 21/3881 |
| 2020/0033142 A1 | 1/2020 | Rug et al. | |
| 2020/0398856 A1* | 12/2020 | Giurgiu | B60W 40/072 |

FOREIGN PATENT DOCUMENTS

| | | |
|---|---|---|
| EP | 1086844 A2 | 3/2001 |
| EP | 3385673 A1 | 10/2018 |
| FR | 2920240 A1 | 2/2009 |
| KR | 101501189 81 | 3/2015 |

OTHER PUBLICATIONS

International Search Report and Written Opinion for International Application No. PCT/EP2019/084913, dated Jan. 24, 2020, with partial English translation, 9 pages.
International Search Report and Written Opinion for International Application No. PCT/EP2019/084913, dated Jan. 24, 2020, 13 pages (French).
Andràšik, R. et al., "Identification of curves and straight sections on road networks from digital vector data," 2013, pp. 73-80, vol. 6(2), Transactions on Transport Sciences.
Coeurjolly, S., et al., "Discrete curvature based on osculating circle estimation," C. Arcelli et al., (Eds.) Visual Form 2001, Lecture Notes in Computer Science, vol. 2059, pp. 303-312, Springer-Verlag Berlin Heidelberg.

* cited by examiner

METHOD FOR CHARACTERISING BENDS FOR WARNING DRIVERS

CROSS REFERENCE TO RELATED APPLICATIONS

This application is the U.S. National Phase Application of PCT International Application No. PCT/EP2019/084913, filed Dec. 12, 2019, which claims priority to French Patent Application No. 1872741, filed Dec. 12, 2018, the contents of such applications being incorporated by reference herein.

FIELD OF THE INVENTION

The invention relates to a method for characterizing the curvature of a road section based on an ordered series of points of the section. The invention also relates to a device for warning a vehicle driver of bends, the bends being characterized by way of the method.

BACKGROUND OF THE INVENTION

For safety reasons, it is important to be able to warn vehicle drivers of an imminent bend, and also to be able to characterize the level of curvature of the bend, so that the driver is able to adapt his speed.

To this end, some solutions have been proposed in which the curvature of a road section being taken by a vehicle is computed in real time based on data detected by sensors on board the vehicle.

This is the case for example in the patent of document US 2005 251 335 A1 or of document U.S. Pat. No. 6,138,084 B, incorporated herein by reference, in which a location of the vehicle is determined based on GPS data cross-correlated with map data, and then the curvature of the upcoming road section being approached by the vehicle is estimated by selecting three points of the section and estimating a curvature of the section based on these points.

These methods exhibit numerous drawbacks. First of all, computing the curvature of a road section being taken by a vehicle in real time may be costly in terms of computing means and may entail a worsening of the performance of the on-board computer in the vehicle for other applications or a delay in displaying information relating to the road section. Second of all, these methods mean having to have continuous access to the exact location of the vehicle. Last of all, these methods do not make it possible to take advantage of the computed information to characterize bends in the road independently of the journeys made by a given vehicle. If the vehicle travels through the same bend again, it has to repeat computations that have already been performed.

Some solutions for identifying bends in road sections based on map data are also known.

For example, the article by R. Andrášik et al. "Identification of Curves and Straight Sections on Road Networks from Digital Vector Data", DOI: 10.2478/v10158-012-0033-0, incorporated herein by reference, describes a method for automatically identifying bends based on geographical data. However, the method described does not make it possible to characterize bends, for example in terms of their level of curvature. However, this information is important in order for a driver to be able to adapt his speed.

Patent application FR 2 920 240 A1, incorporated herein by reference, describes a method for determining the curvature of a road and signaling it to a driver.

Patent application U.S. Pat. No. 5,465,089 A, incorporated herein by reference, describes a method allowing a driver to anticipate a characteristic of a bend on a route. Patent application EP 3 385 673 A1, incorporated herein by reference, describes a method for reducing intermediate nodes based on the Douglas-Peucker algorithm.

To characterize the curvature of a line, numerous techniques have been presented in the article by D. Coeurjolly et al. "Discrete Curvature Based on Osculating Circle Estimation", in: Arcelli C., Cordella L. P., di Baja G. S. (eds) Visual Form 2001, Lecture Notes in Computer Science, vol. 2059. Springer, Berlin, Heidelberg, incorporated herein by reference. In particular, one commonly used technique is that of determining the radius of curvature of a line by adjusting a circle circumscribed at three consecutive points of the line. On the other hand, this technique is applicable only in cases in which the sampling of the points of the line is constant, which is the case in this article since the processing operations are implemented on pixelated images, therefore giving pixel-sampled information.

However, some road maps are not sampled regularly, this being the case for example for certain participative maps in which the data are provided by users.

SUMMARY OF THE INVENTION

In light of the above, one aim of the invention is to propose a means for identifying and classifying bends that is more robust to variable sampling of road map data than the methods from the prior art.

Another aim of the invention is to minimize the number of computations that have to be performed by a vehicle to warn a driver of a bend and to inform him about the curvature and the hazardousness of the bend.

Another aim of the invention is to make it possible to detect a bend exhibiting a tightening and to warn the driver thereof.

In this respect, one subject of the invention is a method for characterizing the curvature of a road section, wherein the road section is described by an ordered series of points, each point being described by coordinates, the method being noteworthy in that it comprises the implementation, by a computer, of the following steps:

a) selecting, from among the points of the section, the points marking a curvature of the section, b) computing, for each selected point of the section contained between the second and the penultimate one, an indicator of curvature of the section at this point, the indicator of curvature of the section at a point being equal to the angular variation of the section at the current selected point divided by the distance between the current selected point and the previous selected point, c) identifying each bend contained in the road section, each bend comprising a set of successive selected points of the section, and d) for each bend contained in the road section, comparing the indicator of curvature of at least one of the points of the bend with a predetermined threshold, and e) if the indicator of curvature computed for at least one of the selected points of the bend exceeds the predetermined threshold, recording, in a database of bends, a data record comprising at least the set of points of the bend, and an item of data characterizing the curvature of the bend.

The item of data characterizing the curvature of the bend may comprise the sum of the angles of the bend computed at each point of the bend, and/or the average value of the indicator of curvature for the set of points of the bend.

Advantageously, the data record recorded in the database of bends furthermore comprises at least one parameter from among the following group:

a bend identifier, for each point of the bend, the angle of the road section at said point, corresponding to the angle formed by a segment linking the current point to the previous point and a segment linking the current point to the following point, for each point of the bend, the distance of the road section between the point and the previous point, for each point of the last bend, the value of the indicator of curvature computed for the point, and if at least one of the computed indicators of curvature exceeds a second threshold greater than the first one, an indicator of the hazardousness of the bend.

Advantageously, the step of selecting the points marking a curvature of the section is implemented by applying the Douglas-Peucker algorithm.

Implementing the Douglas-Peucker algorithm comprises comparing a distance between a point of the section and a segment linking the ends of the section with a threshold distance, and the threshold distance is preferably determined on the basis of parameters of the road section, comprising: nature of the road network to which the section belongs, acquisition frequency of the points of the section, accuracy level with regard to the geographical coordinates of the points of the section.

In one embodiment, steps b) to e) are implemented, for each section, a first time in one direction of running through the selected points of the section, and a second time in the other direction of running through the selected points of the section.

In one embodiment, identifying a bend comprises assigning a bend identifier to each selected point of the section, such that two consecutive points of the section are associated with one and the same bend identifier if:

the section has the same direction of rotation at the two consecutive points, and the distance between the two consecutive points is less than a threshold, or the indicators of curvature at the two consecutive points are greater, in terms of absolute value, than a predetermined threshold.

In one embodiment, the method furthermore comprises computing an indicator of tightening of the curvature of the bend and, if the indicator is greater than a predetermined tightening threshold, recording an indication of tightening of the bend in the data record. The indicator of tightening may be computed as follows, for each of the selected points of the section for which an indicator of curvature is computed, starting from the second one:

$$\frac{\alpha_j - \alpha_{j-1}}{\|\overrightarrow{M_{j-1,j}M_{j,j+1}}\|} \quad [\text{Math. 1}]$$

Where $\alpha_j$ is the indicator of curvature computed at a selected point j of the section, and Mj denotes the midpoint of the segment linking the selected point j to the following selected point of the section.

Another subject of the invention is a computer program product comprising a series of code instructions for implementing the method for characterizing a curvature according to the above description when it is implemented by a computer.

Another subject of the invention is a device for warning a vehicle driver of bends, comprising:

a device for geolocating the vehicle, a human/machine interface, designed to produce an acoustic and/or luminous signal for the attention of the driver of the vehicle, a connection interface to a telecommunications network, and an electronic computer, noteworthy in that it is designed to communicate, via the telecommunications network, with a remote database of bends that is obtained by implementing the method as described above on a plurality of road sections, and in that the electronic computer is configured so as to:

send a request containing the location of the vehicle to the remote database, receive, from the remote database, for each bend contained in a region of a given surface area around the location of the vehicle, the data record corresponding to said bend recorded in the remote database, and based on the location and the heading of the vehicle, detect an upcoming bend being approached by the vehicle and command the human/machine interface to signal the upcoming bend to the driver, the distance between the vehicle and the bend and the item of data characterizing the curvature of the bend.

In one embodiment, a data record corresponding to a bend recorded in the database of bends and received by the electronic computer furthermore comprises at least one of the following additional items of information:

indication of the hazardousness of the bend, and indication of tightening of the bend.

The electronic computer is furthermore configured so as to command the human/machine interface to signal to the driver all of the additional information available regarding the upcoming bend, at the same time as signaling said bend.

An aspect of the invention also relates to a vehicle comprising a device for warning of bends according to the above description.

An aspect of the invention relates lastly to a system for warning of bends, comprising a database of bends, the database of bends being obtained by implementing the method according to the above description on a set of road sections, and at least one device for warning of bends as described above.

The proposed method for characterizing the curvature of a road section is robust to variable map data sampling frequencies. Specifically, on the one hand, it comprises a filtering operation that makes it possible to retain only points marking the curvature of the section, even for excessively great or irregular sampling. This filtering therefore makes it possible to remove numerous irrelevant points and therefore also to reduce the number of computations required.

On the other hand, the indicator of curvature that is used is easy to compute but makes it possible to characterize a bend in such a way as to allow a driver to adapt his speed when approaching this bend.

It is thus possible to develop a database of bends in which only bends having a degree of curvature greater than a certain threshold are referenced, and to do so for an entire territory. Only some of these data, corresponding to a region in which a vehicle is located, may be loaded into the vehicle in order to warn the driver. The number of computations performed in the vehicle is thus highly limited.

BRIEF DESCRIPTION OF THE DRAWINGS

Other features, aims and advantages of aspects of the invention will become apparent from the following description, which is purely illustrative and non-limiting, and which should be read with reference to the appended drawings, in which.

DETAILED DESCRIPTION OF THE PREFERRED EMBODIMENTS

Figure 2:
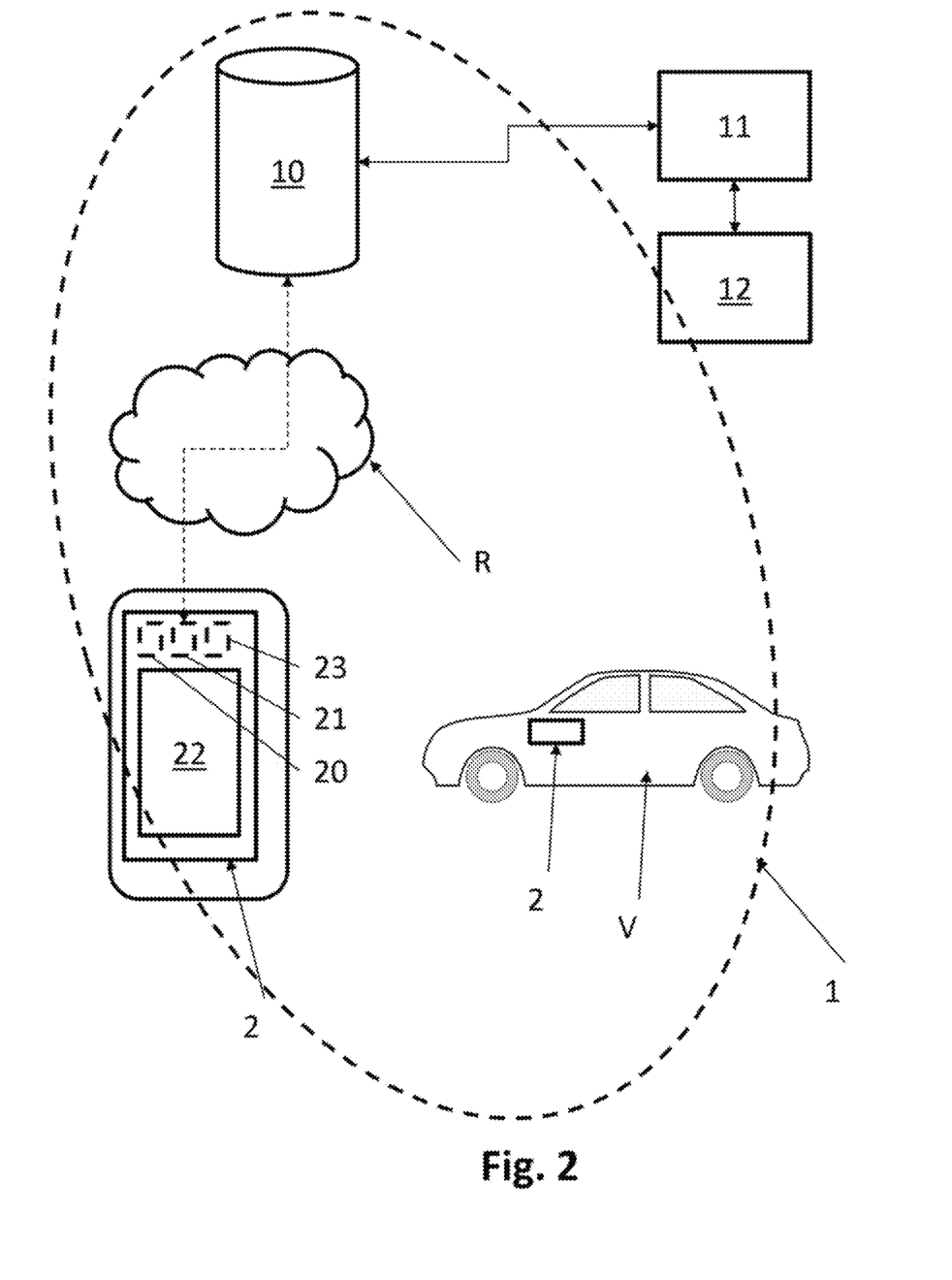
FIG. 2 shows a system for warning of bends according to one embodiment of the invention.

FIG. 2 shows a system 1 for warning of bends, which system comprises a plurality of devices 2 for warning of bends, which devices may be housed on board vehicles, and a remote database 10 of bends, which the devices 2 are able to access remotely via a telecommunications network R.

The database 10 of bends comprises an inventory of a set of bends covering a territory and, for each bend, a data record defined below.

Figure 1:
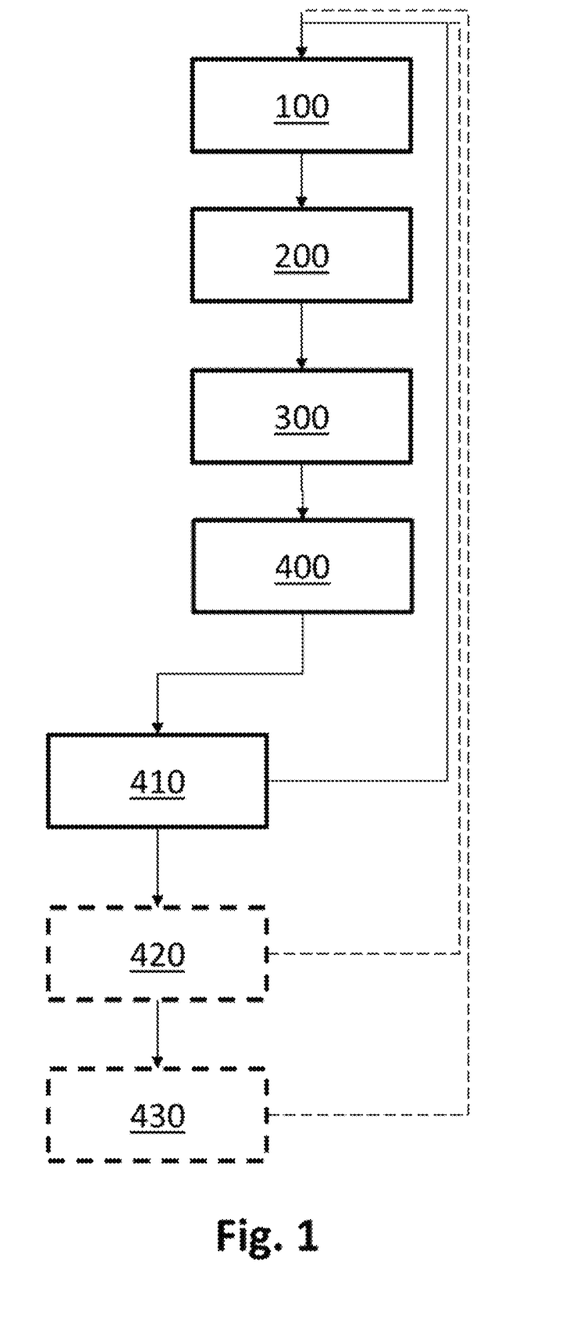
FIG. 1 schematically shows the main steps of a method for characterizing bends according to one embodiment of the invention.

With reference to FIG. 1, a description will now be given of a method for characterizing bends that makes it possible to add a bend, and the data characterizing it, to the database 10 of bends.

This method is implemented by a computer 11 (cf. FIG. 2), for example a processor, a microprocessor, a microcontroller or the like, based on a set of map data stored in a memory 12. The map data comprise data relating to a set of road sections of a territory, each road section being defined by an ordered series of points, and each point being defined by geographical coordinates. For example, the geographical coordinates of a point are the "latitude/longitude" pair of said point.

The points of the ordered series of points defining a section may have been acquired at a variable acquisition frequency, that is to say the distance between two consecutive points of the series may be variable.

Advantageously, but optionally, the data relating to a road section comprise, in addition to the ordered series of points, additional information relating to the nature of the road to which the section belongs, and/or to the characteristics of the acquired data.

For example, the information relating to the nature of the road may comprise information about the type of road to which the section belongs (freeway, highway, urban road, unpaved track, etc.), the width of the road, or else about the number of lanes and the direction of travel (one way or two way) of the road.

The information relating to the characteristics of the acquired data may comprise information about acquisition frequency or uncertainty regarding the data.

The memory 12, or a separate memory, also stores code instructions for the implementation, by the computer, of the method for characterizing bends.

The method for characterizing bends is implemented for each road section stored in the memory 12. It comprises a step 100 of selecting, from among the points of a section, the points marking a curvature of the section. This step makes it possible to reconcile variations in acquisition frequencies between the points of the section by retaining only the points carrying curvature information.

This step 100 is advantageously implemented by applying the Douglas-Peucker algorithm.

Figure 3A:
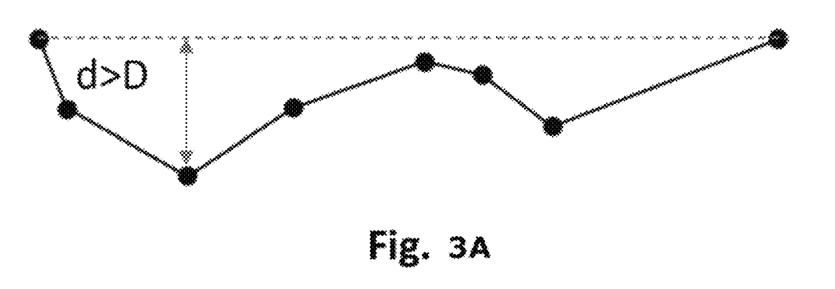
FIG. 3A schematically shows one exemplary implementation of a Douglas-Peucker algorithm for selecting points marking a curvature in a road section.
Figure 3B:
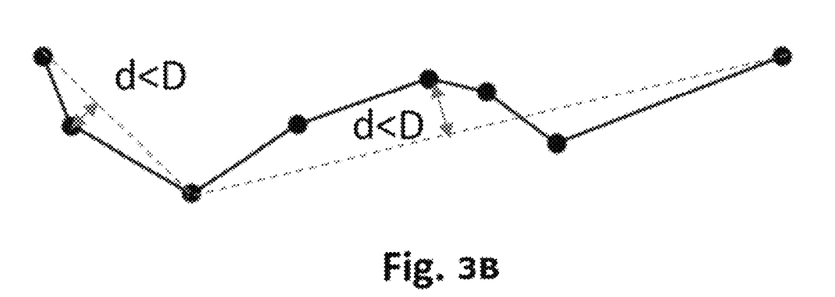
FIG. 3B schematically shows one exemplary implementation of a Douglas-Peucker algorithm for selecting points marking a curvature in a road section.
Figure 3C:
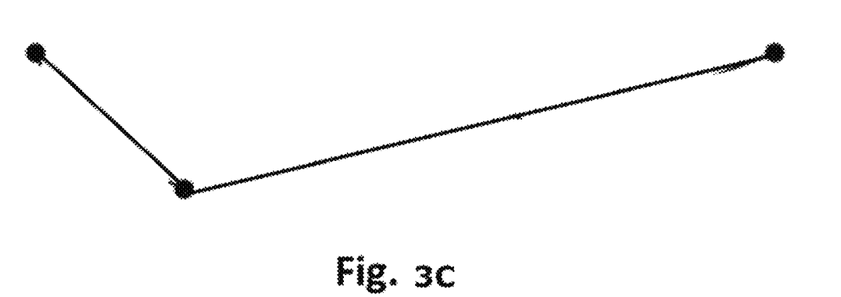
FIG. 3C schematically shows one exemplary implementation of a Douglas-Peucker algorithm for selecting points marking a curvature in a road section.

With reference to FIGS. 3A to 3C, this algorithm comprises an initialization, consisting in defining the bounds of the section, which are the extremities of the section, and in defining a threshold distance D that makes it possible to characterize the curvature of the section.

The algorithm then comprises recursively applying the following steps:

If there is no point between the bounds of the section: end the algorithm,

Else, select the point of the section furthest from the segment formed by the bounds:

If the distance d between this point and the segment formed by the bounds is less than the threshold distance D, eliminate all of the points between the bounds (see FIG. 3B),     Else, then define two new segments formed from the bounds of the section at the selected point, and define the new bounds as the ends of the two new segments (see FIG. 3C)

Advantageously, the threshold distance D used in the implementation of this algorithm may vary on the basis of the section under consideration, this threshold distance being determined on the basis of the information about the type of road and/or the information regarding the characteristics of the acquired data.

For example, the threshold distance D may be greater if the road section concerns a freeway, or if the accuracy with regard to the data is poor. It may be lower if the section concerns a highway, or if the accuracy with regard to the data is better.

This algorithm makes it possible to retain only some of the initial points of the section, which are the points marking the curvature of the section.

The method then comprises a step 200 comprising computing an indicator of curvature of the section on the points selected at the end of step 100.

Figure 4A:
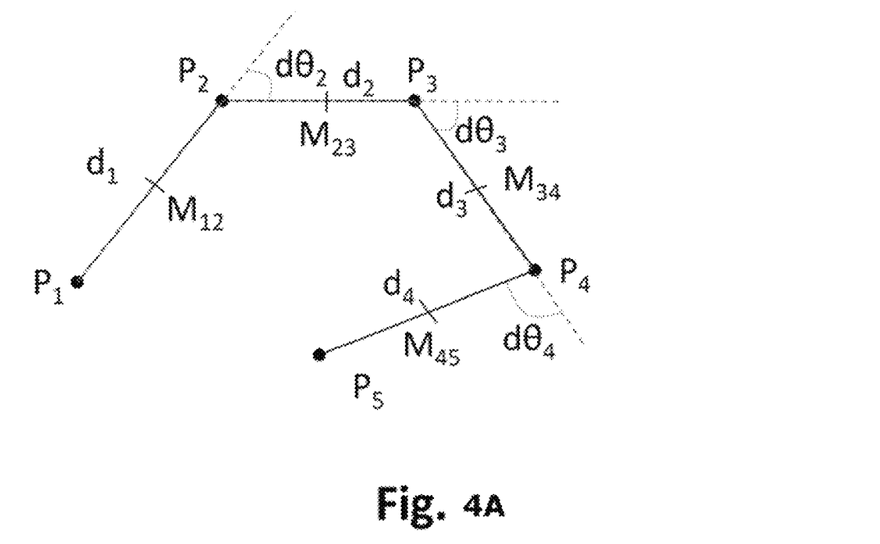
FIG. 4A shows the notations adopted for computing an indicator of curvature of a road section run through in increasing order of indices of the points.

With reference to FIG. 4A, the indicator of curvature a of a point $P_i$ of the section is equal to the angular variation of the section at the point $P_i$, that is to say the angle formed between the segment linking the previous point $P_{i-1}$ to the point $P_i$ and the segment linking the point $P_i$ to the following point $P_{i+1}$ divided by the distance between the point $P_i$ and the previous point.

In the example of FIG. 4A, the points are denoted $P_i$ for i=1 to 5, $d_i$ for i=1 to 4 denotes the distance between the point $P_i$ and $P_{i+1}$, and $d\theta_i$ for i=2 to 4 denotes the angular variation at the point $P_i$, that is to say the angle formed between the segment $[P_{i-1}, P_i]$ and the segment $[P_i, P_{i+1}]$.

This therefore gives:

[Math. 2]
$$\alpha_i = \frac{d\theta_i}{d_{i-1}}, \forall i \in \{2, 3, 4\} \quad (1)$$

Step 200 therefore comprises:
computing the distance $d_i$ corresponding to each point $P_i$ selected at the end of step 100, except for the last one,
computing the angular variation $d\theta_i$ at each point $P_i$ selected at the end of step 100, except for the first and the last point (since $d\theta_i$ is not defined at these points), and
computing the indicator of curvature $\alpha_i$ at each point $P_i$ selected at the end of step 100, except for the first and the last point.

Advantageously, since a road section may contain multiple bends, the method comprises an additional step 300 for identifying each bend on a road section.

This step is advantageously implemented by assigning a bend identifier $v_i$ to each point $P_i$ where the indicator of curvature $\alpha_i$ is defined. Specifically, by virtue of the selection of the points $P_i$ performed in step 100, each point $P_i$ necessarily corresponds to a bend, even if said bend has a low curvature. In this way, all of the points associated with one and the same bend identifier correspond to a bend identified by this identifier.

For the assignment of a bend identifier to each point $P_i$ associated with an indicator of curvature, two successive points $P_i$ and $P_{i+1}$ that satisfy the following conditions are considered to belong to the same bend:
The bend has the same direction of rotation at $P_i$ and at $P_{i+1}$, which is expressed by the fact that $d\theta_i$ and $d\theta_{i+1}$ have the same mathematical sign,
The bend cannot consist of two points having the same direction of rotation but that are separated by a substantially straight segment, which is expressed by the fact that the distance $d_i$ between $P_i$ and $P_{i+1}$ must remain less than a predetermined threshold distance $d_{threshold}$.

In formal terms, the set of points $P_i$ of indices $i \in [a,b]$ (a and b being strictly positive integers) defines just one and the same bend if and only if [a, b] is the largest interval that satisfies:

[Math. 3]
$$\begin{cases} \forall i \in ]a, b-1[, d\theta_i \times d\theta_{i+1} \geq 0 \ (C1) \\ \forall i \in [a, b[, d_i \leq d_{threshold} \ (C2) \end{cases}$$

As a variant, condition (C2) may be replaced with the following alternative condition (C2bis): the segments forming the bend must satisfy a minimum curvature condition, otherwise the bend is considered to have ended since it is too straight. This is expressed by the fact that, at any point $P_i$ of the bend, the absolute value of the indicator of curvature $\alpha_i$ must remain greater than or equal to a predetermined threshold value $\alpha_{straight}$.

The index point interval [a,b] then defines just one and the same bend if and only if the interval [a,b] is the largest interval that satisfies:

[Math. 4]
$$\begin{cases} \forall i \in ]a, b-1[, d\theta_i \times d\theta_{i+1} \geq 0 \ (C1) \\ \forall i \in [a, b[, |\alpha_i| \geq \alpha_{straight} \ (C2bis) \end{cases}$$

$\alpha_{straight}$ is a positive real value, preferably between 0.05 and 10°/m, for example equal to 0.1°/m.

At the end of step 300, each point $P_i$ is therefore associated with a bend identifier $v_i$, and the set of points belonging to one and the same bend is associated with one and the same identifier. The section may contain multiple bends.

Next, in a step 400, for each bend identified in step 300, at least one of the indicators of curvature computed in step 200 for a point of the bend under consideration is compared, in terms of absolute value, with a predetermined threshold $\alpha_{threshold}$. The predetermined threshold may be different from the threshold used for the condition (C2bis) described above. For example, the threshold, which is greater than or equal to 0, is advantageously between 0.01 and 60°/m, for example equal to 1°/m.

In one preferred embodiment, step 400 comprises determining, for each bend, the maximum value of the indicators of curvature computed in step 200, and comparing this maximum value with the predetermined threshold.

As a variant, step 400 may comprise comparing each computed indicator of curvature with the predetermined threshold. According to yet another variant, each indicator of curvature of the bend is compared with the predetermined threshold until one of the indicators of curvature exceeds said threshold.

If at least one indicator of curvature computed in step 200 is greater, in terms of absolute value, than the predetermined threshold, then the bend is considered, in a step 410, to be a sufficiently tight bend, and data corresponding to this bend are stored in the database 10 of bends.

If, in the entire bend, no indicator of curvature is greater than the threshold in terms of absolute value (or, depending on the way in which this step is implemented, if the absolute value of the indicator of maximum curvature of the bend is less than the threshold), the bend under consideration is not classified as being sufficiently tight, and no item of data is added to the database 10 of bends.

Since the geometry of the bends is not necessarily symmetrical, a bend has to be classified twice for each section, running through the section in both directions. To this end, steps 200 to 410 are repeated for the section, for which the points are run through a first time in increasing order of the indices of the points forming the section, and a second time in decreasing order of indices of the points forming the section.

Figure 4B:
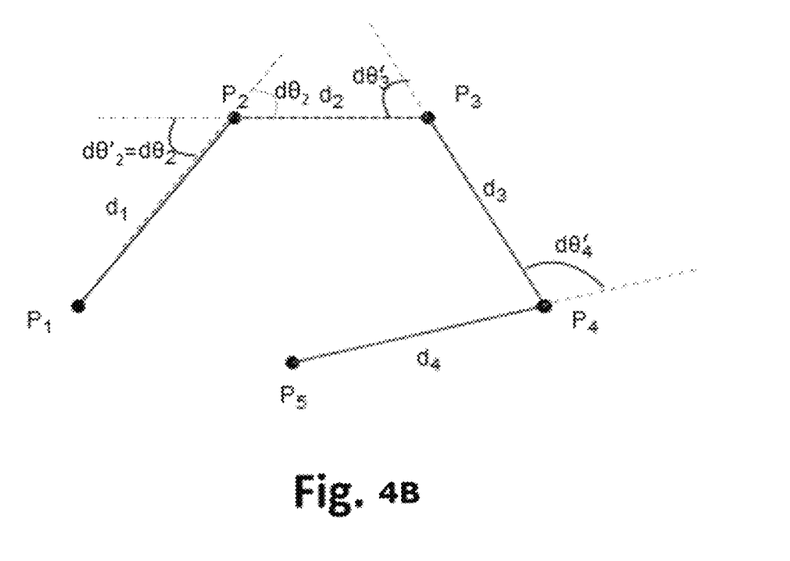
FIG. 4B shows the angles formed between the segments of the road section from FIG. 4A run through in decreasing order of indices of the points.

With reference to FIG. 4B, new indicators are obtained for one and the same section run through in the opposite direction:

[Math. 5]
$$\alpha'_i = \frac{d\theta_i}{d_i}, \forall i \in \{2, 3, 4\} \quad (2)$$

It will be noted from FIG. 4B that the angle $d\theta'_i$ between two successive segments is equal to the angle $d\theta_i$ computed for the same point in the first running direction, since they are opposing angles. $d\theta'_i$ has therefore been replaced with $d\theta_i$ in equation (2) above.

The preferred conditions that define a bend:

[Math. 6]
$$\begin{cases} \forall i \in ]a, b-1[, d\theta_i \times d\theta_{i+1} \geq 0 \ (C1) \\ \forall i \in [a, b[, d_i \leq d_{threshold} \ (C2) \end{cases}$$

Then become:

$$\begin{cases} \forall i \in ]a, b-1[, d\theta_i \times d\theta_{i+1} \geq 0 \ (C1) \\ \forall i \in [a, b[, d_{i+1} \leq d_{threshold} \ (C2') \end{cases} \quad \text{[Math. 7]}$$

As a variant, it is also possible to implement condition (C2bis) described above, which becomes a condition (C2bis)' expressed by the fact that, at any point $P_i$ of the bend, the absolute value of the indicator of curvature $|\alpha'_i|$ must remain greater than or equal to $\alpha_{straight}$.

The set of index points [a,b] then defines just one and the same bend if and only if the interval [a,b] is the largest interval that satisfies:

$$\begin{cases} \forall i \in ]a, b-1[, d\theta_i \times d\theta_{i+1} \geq 0 \ (C1) \\ \forall i \in [a, b[, |\alpha'_i| \geq \alpha_{straight} \ (C2bis)' \end{cases} \quad \text{[Math. 8]}$$

The method may be repeated for the next section (arrow returning to step 100 in FIG. 1).

The data stored in step 410 relating to each section are designed to allow the bends in the section to be characterized.

These data thus comprise at least:
the set of points selected for this section at the end of step 100, and
for each bend, an item of data characterizing the curvature of the bend, this item of data comprising the sum of the angles $d\theta_i$ computed in step 200 for the set of points of the bend, which therefore corresponds to the total curvature of the bend, and/or the average value of the indicator a computed in step 200 on the set of points of the bend, which therefore makes it possible to characterize whether or not the bend is tight.

Advantageously, the data record stored for a bend also comprises the following data:
The identifier $v_i$ of the bend,
for each selected point of the bend, the angle $d\theta_i$ of the road section at said point (except for the first and the last point of the section where this item of data is not available),
for each selected point of the bend, the distance $d_i$ of the road segment between the selected point and the previous point (except for the last point of the section where the item of data is not available),
for each selected point of the bend, the value of the indicator of curvature $\alpha_i$ computed for the point (except for the first and the last point of the section where this item of data is not available).

The data record may also comprise the coordinates of a central point of the bend or else the coordinates of the point where the indicator of curvature is at a maximum, and the identifier of the direction in which the bend is being approached. Therefore, depending on the direction, one and the same bend may be recorded in the memory only for one direction of travel, or if it is recorded for both directions of travel, the maximum value of the indicator of curvature may be different since said bend is not symmetrical (cf. formulae 1 and 2).

Advantageously, the data record furthermore comprises the geographical coordinates of a set of additional points located upstream of the bend, in relation to the direction of movement of the vehicle, and forming a warning path. As described in more detail below, this warning path may be used to detect the presence of a vehicle about to enter the bend, and to signal the bend to the driver. It will be understood that the coordinates of the points of the warning path also change on the basis of the direction in which the bend is approached.

Advantageously, when a bend is recorded in the database of bends, the method furthermore comprises a step 420 in which the maximum value of the indicator of curvature for the bend is compared with a second predetermined threshold $\alpha'$, greater than the first threshold $\alpha_{seuil}$ and than the threshold of condition C2bis $\alpha_{straight}$. This threshold is advantageously established so as to characterize the hazardousness of a bend. For example, this threshold is advantageously between 5 and 60°/m.

If the indicator of maximum curvature of the bend is greater than this second threshold, then the data record relating to the bend furthermore comprises an indication of the hazardousness of the bend. This indication may be a true/false binary variable.

As a variant, this step may comprise comparing the maximum value of the indicator of curvature with a plurality of thresholds in order to be able to place the bend on a scale of hazardousness on the basis of the maximum curvature. In this case, the indication of the hazardousness of the bend may correspond to the classification of the bend in the scale of hazardousness.

In addition, the method for characterizing bends advantageously makes it possible to characterize the tightening of a bend, that is to say the fact that the initial curvature of the bend is less than its maximum curvature. Specifically, the tightening of a bend may be particularly hazardous, in particular for motorcyclists, since the initial curvature of the bend may generate a lack of visibility that prevents the driver from realizing that this curvature then increases.

To this end, the method advantageously comprises implementing, for each bend recorded in the database, an additional step 430 in which, starting from the second point for which the indicator of curvature was computed in step 200, an indicator of tightening at the point is computed and compared with a predetermined threshold. If the computed indicator is greater than said threshold for at least one of the points for which it is computed, then the data record relating to the bend recorded in the database of bends comprises an indicator of tightening of the bend, which may typically be a true/false binary value.

According to one preferred embodiment, the indicator of tightening at a point $P_i$ is computed as follows:

$$\frac{\alpha_i - \alpha_{i-1}}{\|\overrightarrow{M_{i-1,i} M_{i,i+1}}\|}, \forall i \in \{3, \ldots, n-1\} \quad \text{[Math. 9]}$$

Where $M_{i,j}$ is the geographical position of the midpoint of the segment linking two points $P_i$ and $P_j$.

In this case, the threshold with which this indicator of tightening is compared is advantageously between 0 and 10, for example equal to 5.5.

As a variant, the indicator of tightening may be computed as follows:

$$\frac{\alpha_i - \alpha_{i-1}}{d_i}, \forall i \in \{3, \ldots, n-1\} \quad \text{[Math. 10]}$$

For this variant, the threshold with which this indicator of tightening is compared is also between 0 and 10, for example 5.5.

Implementing the method described above on all of the road sections identified in a given geographical region therefore makes it possible to develop a database of the bends in the geographical region.

This database is then used by vehicle users depending on their location.

Returning to FIG. 2, this shows a device 2 for warning a vehicle driver of bends. The vehicle V may typically be an automobile, but it may also be a motorcycle, a scooter, a truck, or any other vehicle.

The device 2 for warning of bends comprises a device 20 for geolocating the vehicle V, for example a satellite-based or GPS-based positioning sensor, a connection interface 21 to the telecommunications network R, for example a network using one of the protocols GPRS, EDGE, UMTS, 3G, 4G, Wi-Fi, WIMAX, Internet, etc., allowing the device 2 for warning of bends to communicate with the database 10 of bends via the telecommunications network R.

The device 2 for warning of bends also comprises a human/machine interface 22, designed to produce an acoustic and/or luminous signal for the attention of the driver of the vehicle V. For example, this interface may advantageously comprise a screen on which information may be displayed, or one or more indicator lights. It may also comprise a loudspeaker designed to broadcast acoustic signals.

The device 2 for warning of bends also comprises a computer 23, which may be a processor, a microprocessor, a controller, a microcontroller, etc.

According to one advantageous embodiment, the device 2 for warning of bends is integrated into the vehicle V. In this case, the human/machine interface 22 may be integrated into an information broadcasting interface of the vehicle V, such as an instrument panel or a dashboard, and also comprise the loudspeaker or loudspeakers of the vehicle V. In this case too, the computer 23, the connection interface 21 to the network and the geolocation device 20 are elements integrated into the vehicle V.

As a variant, the device 2 for warning of bends may be integrated into a personal electronic device of a driver or user of the vehicle V, such as a mobile telephone, or a touchscreen tablet. In this case, the computer 23, the connection interface 20 and the geolocation device 20 are integrated into the telephone or the tablet, and the human/machine interface 22 is formed by the screen of the telephone or of the tablet as well as the loudspeaker or loudspeakers.

The computer 23 is configured so as to retrieve location information of the vehicle V from the geolocation device 20, and send a request to the database, comprising the location information of the vehicle V.

In response to this request, the computer 23 receives, from the database, the data records corresponding to each of the bends located in a given geographical region, which is dependent on the geographical location of the vehicle V sent to the database.

According to one non-limiting example, all of the bends comprising at least one point in a geographical region of a given surface area around the location of the vehicle V are selected, and the corresponding data are transmitted to the computer 23.

According to another example, all of the bends whose midpoint, or a point for which the indicator is at a maximum in terms of absolute value, is located at a distance from the vehicle V less than a threshold distance are selected, and the corresponding data are transmitted to the computer 23. This threshold distance is between 1 and 100 km, for example 15 km.

The frequency of transmission of the location information of the vehicle V by the computer 23 depends on the size of the geographical region containing the bends for which the data are retrieved. The larger this geographical region, the lower the transmission frequency, but on the other hand the greater the amount of data to be loaded by the computer 23.

Once bend data have been retrieved for a geographical region, the computer 23 is configured so as to detect an upcoming bend being approached by the vehicle V from among all of the bends for which it has loaded the data, based on the updated location of the vehicle V, and to command the human/machine interface to emit a warning signal regarding the upcoming bend.

To this end, the computer 23 receives the location data from the device for locating the device V at a frequency greater than that implemented in step 300. For example, the computer may receive the location data of the vehicle V once per second; this frequency is generally between 5 times per second and once every 5 seconds.

In order to detect the upcoming bend being approached by the vehicle V, the computer 23 records the updated location data and the heading of the vehicle V, and compares them with the points of the access path of each bend and with the direction of the segments forming this access path.

If the distance between the location of the vehicle V and the position of the point used for the comparison is less than a threshold and the heading of the vehicle V is close to that followed by the warning path, then the computer 23 deduces that the vehicle V is going to enter the bend.

The distance between the location of the vehicle V and the start of the detected upcoming bend is optionally compared with a second threshold, lower than the first threshold, and if this distance is less than the second threshold, the warning is not sent so as not to disturb the driver when he is too close to the bend and will not have time to react. This second threshold distance is preferably between 0 and 200 m, for example set to 30 m.

The warning signal produced by the human/machine interface in order to signal a bend comprises at least one indication of the existence of the bend, and the item of characterization data stored with the bend, that is to say either the maximum value of the indicator of curvature or the total value of the curvature of the bend (that is to say the sum of the angles $d\theta_i$ computed for the bend).

According to one non-limiting example, the warning signal may be a visual signal comprising an arrow in the direction of the bend (left or right) in order to signal the existence of the bend, coupled with a value that corresponds to the total curvature of the bend.

Advantageously, if, during the method for characterizing the bend, the indicator of maximum curvature of the bend exceeds the second hazardousness threshold, the human/machine interface also produces an indication of the hazardousness of the signal. By way of non-limiting example, this indication may be a visual indication in the form of an exclamation mark, or be an acoustic signal.

As a variant, when the indicator of maximum curvature of the bend has been compared, in step 420 of the characterization method, with multiple thresholds in order to characterize the hazardousness of the bend, the indication provided by the human/machine interface may be the degree of hazardousness of the bend.

This degree of hazardousness may be more meaningful for a driver and may then replace the maximum value of the indicator of curvature in the warning signal produced by the human/machine interface.

If the characterization method also comprises determining a tightening of the bend, the human/machine interface also produces an indication of the tightening of the bend.

The invention claimed is:

1. A method for characterizing the curvature of a road section, wherein the road section is described by an ordered series of points, each point being described by coordinates, the method comprises the implementation, by a computer, of:
   a) selecting, from among the points of the section, the points marking a curvature of the section,
   b) computing, for each selected point of the section contained between the second and the penultimate one, an indicator of curvature of the section at this point, the indicator of curvature of the section at a point being equal to the angular variation of the section at the current selected point divided by the distance between the current selected point and the previous selected point,
   c) identifying each bend contained in the road section, each bend comprising a set of selected points of the section, and
   d) for each bend contained in the road section, comparing the indicator of curvature of at least one of the points of the bend with a predetermined threshold, and
   e) if the indicator of curvature computed for at least one of the selected points of the bend exceeds the predetermined threshold, recording, in a database of bends, a data record comprising at least the set of points of the bend, and an item of data characterizing the curvature of the bend,
   f) receiving a request containing the location of a vehicle, and
   g) for each bend contained in a region of a given surface area around the location of the vehicle received in the request, transmitting, to said vehicle, the data record corresponding to said bend recorded in the database.

2. The method for characterizing a curvature as claimed in claim 1, wherein the item of data characterizing the curvature of the bend comprises the sum of the angles of the bend computed at each point of the bend, and/or the average value of the indicator of curvature for the set of points of the bend.

3. The method for characterizing the curvature of a road section as claimed in claim 2, wherein the data record recorded in the database of bends furthermore comprises at least one from among the following group:
   a bend identifier,
   for each point of the bend, the angle of the road section at said point, corresponding to the angle formed by a segment linking the current point to the previous point and a segment linking the current point to the following point,
   for each point of the bend, the distance of the road section between the point and the previous point,
   for each point of the last bend, the value of the indicator of curvature computed for the point, and
   if at least one of the computed indicators of curvature exceeds a second threshold greater than the first one, an indicator of the hazardousness of the bend.

4. The method for characterizing the curvature of a road section as claimed in claim 1, wherein the data record recorded in the database of bends furthermore comprises at least one from among the following group:
   a bend identifier,
   for each point of the bend, the angle of the road section at said point, corresponding to the angle formed by a segment linking the current point to the previous point and a segment linking the current point to the following point,
   for each point of the bend, the distance f8+-of the road section between the point and the previous point,
   for each point of the last bend, the value of the indicator of curvature computed for the point, and
   if at least one of the computed indicators of curvature exceeds a second threshold greater than the first one, an indicator of the hazardousness of the bend.

5. The method for characterizing the curvature of a road section as claimed in claim 1, wherein the step of selecting the points marking a curvature of the section is implemented by applying the Douglas-Peucker algorithm.

6. The method for characterizing a curvature as claimed in claim 5, wherein implementing the Douglas-Peucker algorithm comprises comparing a distance between a point of the section and a segment linking the ends of the section with a threshold distance, and the threshold distance is determined on the basis of parameters of the road section, comprising:
   nature of the road network to which the section belongs,
   acquisition frequency of the points of the section,
   accuracy level with regard to the geographical coordinates of the points of the section.

7. The method for characterizing a curvature as claimed in claim 1, wherein steps b) to e) are implemented, for each section, a first time in one direction of running through the selected points of the section, and a second time in the other direction of running through the selected points of the section.

8. The method for characterizing a curvature as claimed in claim 1, wherein identifying a bend comprises assigning a bend identifier to each selected point of the section, such that two consecutive points of the section are associated with one and the same bend identifier if:
   the section has the same direction of rotation at the two consecutive points, and
   the distance between the two consecutive points is less than a threshold4, or the indicators of curvature at the two consecutive points are greater, in terms of absolute value, than a predetermined threshold.

9. The method for characterizing a curvature as claimed in claim 1, furthermore comprising computing an indicator of tightening of the curvature of the bend and, if the indicator is greater than a predetermined tightening threshold, recording an indication of tightening of the bend in the data record.

10. The method for characterizing a curvature as claimed in claim 9, wherein the indicator of tightening is computed as follows, for each of the selected points of the section for which an indicator of curvature is computed, starting from the second one:

$$\frac{\alpha_j - \alpha_{j-1}}{\|\overrightarrow{M_{j-1,j} M_{j,j+1}}\|}$$ [Math. 1]

Where $\alpha_j$ is the indicator of curvature computed at a selected point j of the section, and $M_j$ denotes the midpoint of the segment linking the selected point j to the following selected point of the section.

11. A computer program product comprising a series of code instructions for implementing the method for characterizing a curvature as claimed in claim 1 when it is implemented by a computer.

12. A system for warning of bends, comprising a database of bends, the database of bends being obtained by implementing the method as claimed in claim 1 on a set of road sections, and at least one device for warning of bends, comprising:
- a device for geolocating the vehicle,
- a human/machine interface, designed to produce an acoustic and/or luminous signal for the attention of the driver of the vehicle,
- a connection interface to a telecommunications network, and
- an electronic computer,
- wherein the electronic computer is designed to communicate, via the telecommunications network, with the remote database of bends, and the electronic computer is configured so as to:
  - send a request containing the location of the vehicle to the remote database, receive, from the remote database, for each bend contained in a region of a given surface area around the location of the vehicle, the data record corresponding to said bend recorded in the remote database, and
  - based on the location and the heading of the vehicle, detect an upcoming bend being approached by the vehicle and command the human/machine interface to signal the upcoming bend to the driver, the distance between the vehicle and the bend and the item of data characterizing the curvature of the bend.

13. A device for warning a vehicle driver of bends, comprising:
- a device for geolocating the vehicle,
- a human/machine interface, designed to produce an acoustic and/or luminous signal for the attention of the driver of the vehicle,
- a connection interface to a telecommunications network, and
- an electronic computer,
- wherein the electronic computer is designed to communicate, via the telecommunications network, with a remote database of bends that is obtained by implementing the method as claimed in claim 1 on a plurality of road sections, and in that the electronic computer is configured so as to:
- send a request containing the location of the vehicle to the remote database,
- receive, from the remote database, for each bend contained in a region of a given surface area around the location of the vehicle, the data record corresponding to said bend recorded in the remote database, and
- based on the location and the heading of the vehicle, detect an upcoming bend being approached by the vehicle and command the human/machine interface to signal the upcoming bend to the driver, the distance between the vehicle and the bend and the item of data characterizing the curvature of the bend.

14. The device for warning of bends as claimed in claim 13, wherein a data record corresponding to a bend recorded in the database of bends and received by the electronic computer furthermore comprises at least one of the following additional items of information:
- indication of the hazardousness of the bend, and
- indication of tightening of the bend,
- and the electronic computer is furthermore configured so as to command the human/machine interface to signal to the driver all of the additional information available regarding the upcoming bend, at the same time as signaling said bend.

15. A vehicle, comprising a device for warning of bends as claimed in claim 14.

16. A vehicle, comprising a device for warning of bends as claimed in claim 13.

* * * * *

UNITED STATES PATENT AND TRADEMARK OFFICE
CERTIFICATE OF CORRECTION

| | | |
|---|---|---|
| PATENT NO. | : 11,740,101 B2 | Page 1 of 1 |
| APPLICATION NO. | : 17/296753 | |
| DATED | : August 29, 2023 | |
| INVENTOR(S) | : Grégoire Corbiere, Jean Ibarz and Romain Lafumat | |

It is certified that error appears in the above-identified patent and that said Letters Patent is hereby corrected as shown below:

In the Claims

Column 14, Line 7, Claim 3, delete "f8+-".

Column 14, Line 41, Claim 8, "threshold4" should read -- threshold --.

Signed and Sealed this
Seventeenth Day of October, 2023

Katherine Kelly Vidal
*Director of the United States Patent and Trademark Office*